Feb. 26, 1957 S. C. EASTWOOD 2,783,186
METHOD AND APPARATUS FOR HYDROCARBON CONVERSION
Filed July 7, 1951 2 Sheets-Sheet 2
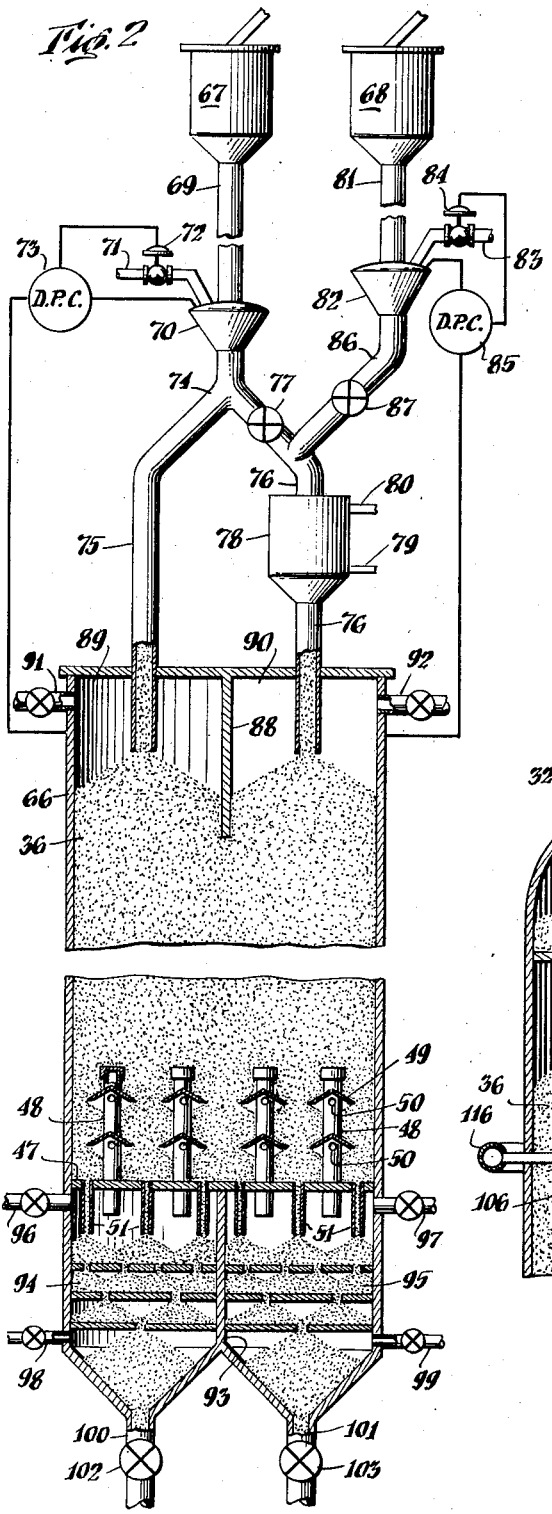
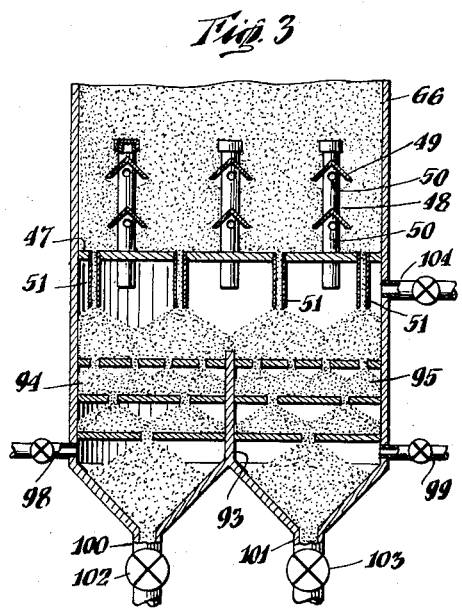
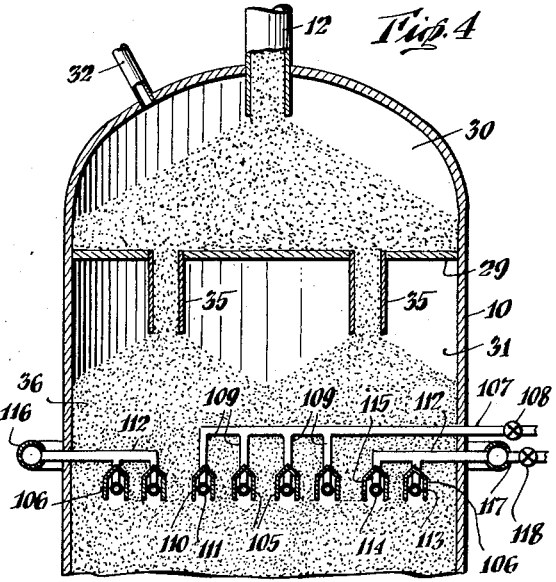
INVENTOR.
Sylvander C. Eastwood
BY
John A. Crowley, Jr.
ATTORNEY

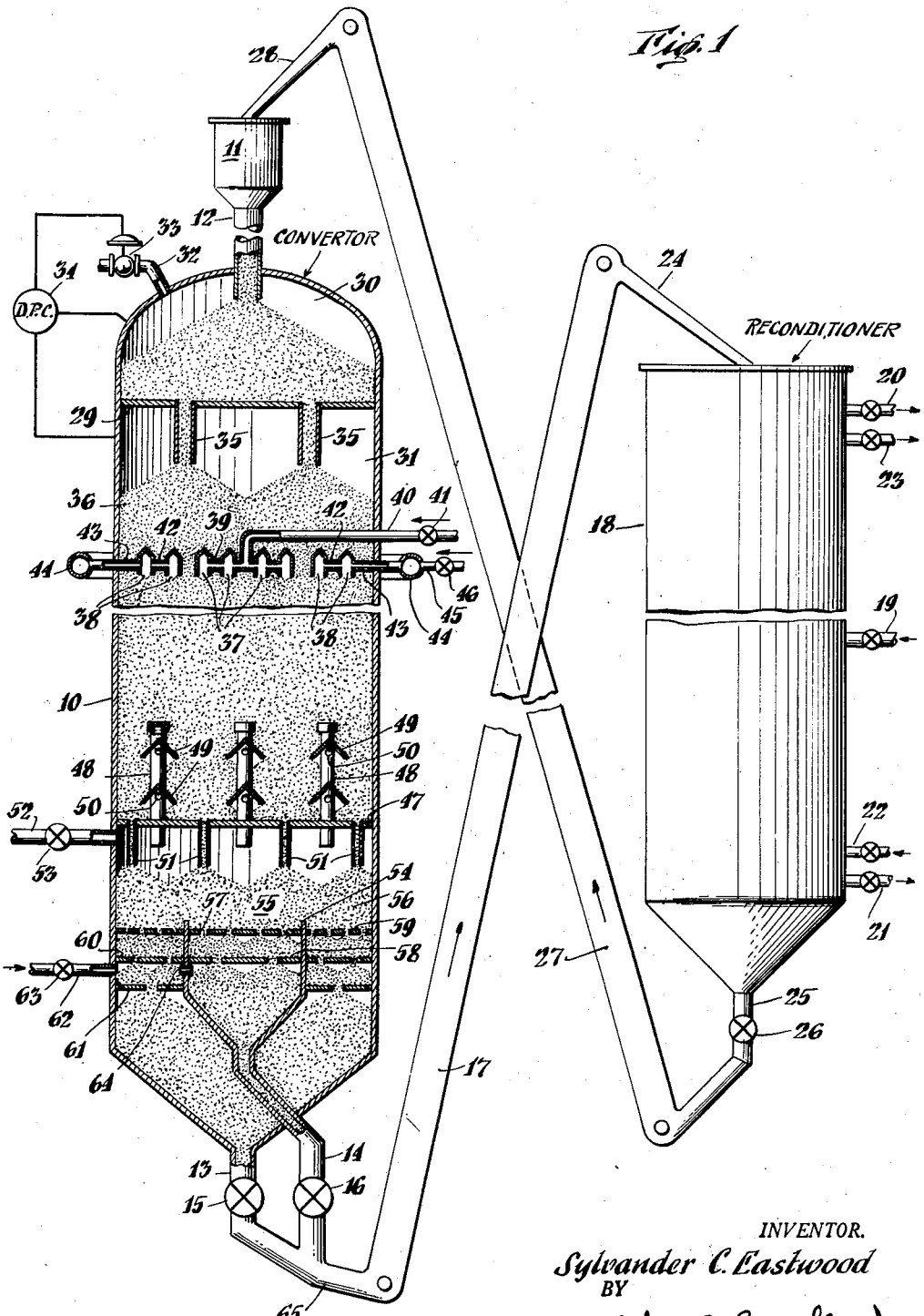

United States Patent Office 2,783,186
Patented Feb. 26, 1957

2,783,186

METHOD AND APPARATUS FOR HYDROCARBON CONVERSION

Sylvander C. Eastwood, Woodbury, N. J., assignor to Socony Mobil Oil Company, Inc., a corporation of New York Application July 7, 1951, Serial No. 235,607

3 Claims. (Cl. 196—52)

This invention has to do with a method and apparatus for conducting hydrocarbon conversions in the presence of a moving granular contact mass material which may or may not be catalytic in character. Exemplary of processes to which this invention applies are the catalytic hydrogenation, dehydrogenation, reforming, polymerization, alkylation or cracking of hydrocarbons, by contact with a solid granular catalytic material and the thermal visbreaking, coking or cracking of liquid or vaporized hydrocarbons by contact with heated granular inert materials. Typical is the catalytic cracking conversion of high boiling liquid or vaporized hydrocarbon charge to lower boiling gasoline containing hydrocarbons by contacting said charge in a conversion zone with a cyclically moving compact column of solid granular adsorbent catalytic material. The catalytic material passes from the conversion zone to a regeneration zone wherein it is contacted with a combustion supporting gas such as air to burn off the carbonaceous contaminants deposited thereon in said conversion zone.

In such moving-bed type systems wherein the contact material is catalytic in nature it may partake of the nature of natural or treated clays, synthetic associations of silica, alumina or silica and alumina or inert carriers bearing deposits of certain metallic oxides. Other catalysts suitable for use in this invention include dehydrogenation catalysts such as mixtures of alumina with chromium oxide, molybdenum oxides or other oxides, or sulfides of metals from the VI group of the periodic system. When the contact material is inert in character it may partake of the form of zirkite, corhart material, or mullite or it may partake of the form of stones or metallic particles or balls. It is desirable, in any event, to maintain the contact material particles within the size range about 3 to 100 mesh and preferably within the range about 4 to 20 mesh by Tyler standard screen analysis. The contact material may be in the form of pellets, spheres, tablets or irregularly shaped particles and it should be understood that the term "granular" as employed herein broadly covers any of the above.

In processes of the above-mentioned types, various hydrocarbon charge stocks will differ considerably in their refractiveness. Thus it is necessary to adjust conditions within the conversion zone of the reactor to conform to the particular requirements of each charge stock. The ordinary oil refinery will operate on two or more such charge stocks at the same time and the problem of simultaneously converting the heavier portions of both these charge stocks to lower boiling gasoline containing products occurs. Simply mixing the two stocks and adjusting conditions within the conversion zone to some point intermediate in severity between the conditions optimum for each stock is not entirely satisfactory since the product obtained is not of as high a quality for a given gasoline yield as might be obtained by the conversion of each stock separately. Of course, a separate conversion vessel may be used for each charge stock but the resultant increase in cost is prohibitive in many cases. Using only one conversion vessel it is possible to operate for a fixed period of time on each charge stock. This system, however, makes it necessary to provide considerable storage facilities for each stock and results in large losses in operating time since conditions in the conversion vessel must be altered each time the charge stock is changed.

The prior art discloses several systems of conducting a multiplicity of reactions in the same contact material bed by means of superimposed zones for each reaction. These systems are not entirely satisfactory since they require a large height for the reaction apparatus and suffer from a lack of flexibility of control.

It has been discovered that gases introduced at the same pressure and at horizontally spaced apart points within a column of contact material granules do not mix to any substantial degree over a considerable vertical length of said column.

This invention makes use of this discovery and defines a hydrocarbon conversion system in which a plurality of charge stocks of different refractiveness may be processed within the same conversion zone, each charge stock being subjected to the conditions most desirable for its conversion.

A major object of this invention is the provision, in a system wherein contact material is contacted as a substantially compact moving column with fluid reactants, of a method and apparatus for conducting a plurality of different reactions of said fluid reactants under substantially different conditions within the same conversion zone.

A specific object of this invention is the provision, in a hydrocarbon conversion system wherein contact material passes cyclically through a conversion zone and a reconditioning zone, of a method and apparatus for processing a plurality of charge stocks of different refractiveness simultaneously within the same contact material column, each stock being processed under the conditions most suitable for its conversion.

These and other objects of the invention will become apparent from the following discussion.

The invention may be most easily understood by reference to the drawings attached hereto, of which, Figure 1 is an elevational view, partially in section, showing the general arrangement of a cyclic hydrocarbon conversion system of the type to which this invention pertains and showing the application of one form of this invention to the converter vessel;

Figure 2 is an elevational view, partially in section, of a converter vessel employing a second form of this invention;

Figure 3 is a vertical view, partially in section, of an alternate form of the product withdrawal system shown in the lower section of Figure 2;

Figure 4 is a vertical view, partially in section, of the upper portion of a conversion vessel employing a third form of the invention.

All of these drawings are highly diagrammatic in form.

Turning now to Figure 1, we see a cylindrical converter 10 and a reconditioner 18 positioned side by side with conveyors 17 and 27 provided for the transfer of granular contact material between converter and reconditioner. The conveyors may be of any suitable construction adapted to transfer hot contact material particles without severe breakage and attrition, for example, bucket elevators. Reconditioner 18 is provided with a contact material feed conduit 24 at its upper end and a contact material drain conduit 25 at its lower end. Converter 10 is provided with a contact material feed hopper 11 which feeds contact material into converter 10 by means of gravity feed leg 12. Extending transversely across converter 10 at its upper end is partition 29 which divides the converter into a seal zone 30 above the partition and a conversion zone 31 therebelow. Inert seal gas such as steam or flue gas may be introduced into seal chamber 30 through conduit 32 at a rate so controlled by diaphragm valve 33 and differential pressure controller 34 as to maintain an inert gaseous pressure adjacent to the lower end of contact material feed leg 12 above the gaseous pressure in hydrocarbon conversion zone 31. In this manner escape of hydrocarbons through the contact material feed system is prevented.

A plurality of horizontally spaced apart vertical conduits 35 depend downwardly from partition 29 and supply the contact material to column 36 within conversion chamber 31. Just beneath the surface of contact material column 36 are situated two sets of vapor distributors 37 and 38. These distributors may be in the form of ring shaped inverted angle roofed troughs. Vapor distributors 37 are interconnected by means of nipples 39 and connected to conduit 40 with control valve 41. Vapor distributors 38 are interconnected by means of nipples 42. Conduits 43 connect these distributors to a ring header 44 from which conduit 45 with control valve 46 extends.

Extending transversely across the lower end of converter 10 is partition 47. Vapor collecting conduits 48 extend upwardly from a point just below to a point substantially above partition 47 and are closed off at their upper ends. Extending outwardly and horizontally from conduits 48 are upwardly pointing angle pieces 49 and beneath each angle piece an orifice 50 passes through the wall of conduit 48. Horizontally spaced apart vertical conduits 51 depend downwardly from partition 47 and terminate a short distance therebelow. Conduit 52 with valve 53 extends through the wall of vessel 10 at a point below partition 47 but above the lower end of conduits 51. Situated a vertical distance beneath conduits 51 is a cylindrical member 54 substantially less in diameter than converter 10. This cylinder divides the lower end of converter 10 into two portions, a central cylindrical region 55 within 54, and an annular region 56, outside of 54. Cylinder 54 is provided with baffle plates 57 and 58, each having a plurality of orifices. These plates act to draw contact material uniformly from the central region 55 of converter 10. Baffle plates 59, 60 and 61 are provided between the outer wall of cylinder 54 and the wall of converter 10 so that contact material may be withdrawn uniformly from annular space 56. A conduit 62 with control valve 63 is provided for the introduction of inert purge gas such as steam or flue gas into the converter to free the used contact material of any reactants remaining thereon. Purge gas enters cylinder 54 by means of nipple 64. A contact material withdrawal conduit 14 is provided for cylinder 54 while contact material is withdrawn from the remainder of the converter cross-section through conduit 13.

In operation, used contact material is fed to the top of reconditioner 18 by means of conduit 24 and passes through the reconditioner as a substantially compact column at a rate controlled by valve 26. In such processes as the catalytic cracking conversion of hydrocarbons a substantial amount of carbonaceous contaminant is deposited upon the use contact material in which case the reconditioner takes the form of a catalyst regenerator. A regenerating medium capable of supporting combustion, such as air, is introduced to the regenerator by means of conduit 19 near the center of vessel 18. Flue gas may be withdrawn through conduits 20 and 21. In order to remove sufficient heat from the regenerating catalyst to prevent overheating of the catalyst to heat damaging levels, cooling tubes (not shown) may be provided within the reconditioner and supplied with a suitable cooling fluid through conduit 22. Cooling fluid may be withdrawn through conduit 23. Other regenerator constructions than that shown and described hereinabove are contemplated within the scope of this invention. If the process involved is a strictly non-catalytic process, for example, in which the amount of coke deposited on the contact material is negligible or if it be a process wherein the amount of coke deposited on the contact material is insufficient upon combustion to heat the contact material to the desired inlet temperature to the converter, the reconditioner 18 may take the form of an apparatus, the principal function of which is to heat the contact material. Reconditioned contact material is removed through conduit 25 and transferred by means of conveyor 27 and conduit 28 to hopper 11. Contact material gravitates from hopper 11 into seal chamber 30 by means of gravity leg 12 and then passes into conversion zone 31 through conduits 35. A vaporized hydrocarbon reactant is introduced to the vertically extending region at the center of column 36 through conduit 40 and distributors 37. A second vaporized hydrocarbon reactant is introduced to the outer vertically extending annular region of column 36 by means of conduits 45 and 43 and distributors 38. The second reactant may if desired be introduced at a substantially different temperature than the first reactant. These two hydrocarbon reactants pass downwardly through the two regions of contact material column 36 and are converted to hydrocarbon products which are disengaged from column 36 by means of angle pieces 49 and are removed from the conversion zone through conduit 52. Interflow between the two regions of the column is avoided by controlling flow conditions of the charge stocks so that the pressure at corresponding levels in adjacent regions is substantially the same. Granular contact material from any of the two regions of the column may be caused to gravitate downwardly at different rates in each region as determined by the settings of valves 15 and 16. Thus, if it is desired to effect the conversion of two charge stocks one of which requires more severe conditions than the other, the more refractive charge stock may, for example, be introduced at a higher temperature through conduit 41 than the less refractive stock introduced through conduit 45. Also, the central region of contact material column 36 may be made to move at a more rapid rate than the remaining portion of column 36. The more refractive charge stock by this means is subjected to more severe conditions of temperature and contact material to oil ratio than is the less refractive charge stock and a uniform product is obtained. Used contact material particles pass downwardly through pipes 51 and the central region of the column gravitates through the orifices in distributor plates 57 and 58 and out of the conversion zone through conduit 14. The remainder of the contact material column passes through the orifices in distributor plates 59, 60 and 61 and out through conduit 13. Contact material streams from conduits 13 and 14 are combined in conduit 65 and transferred to the top of reconditioner 18 by means of conveyor 17 and conduit 24. If desired, two reconditioners may be provided, one to handle contact material from 13 and another to handle contact material from 14. Thus each reconditioner could be maintained at the conditions most desirable for the particular contact material stream being reconditioned.

Figure 2 illustrates an alternative construction for the converter shown in Figure 1 which provides for a more flexible operation. Like parts in both drawings bear the same numerals. In Figure 2, the converter 66 is of rectangular horizontal cross-section. Two feed hoppers 67 and 68 are provided for the supply of contact material. Feed hopper 67 connects by means of a gravity feed leg 69 into a seal chamber 70. Seal chamber 70 is provided with a conduit 71 with valve 72 controlled by differential pressure controller 73 for the admission of inert seal gas. Beneath seal chamber 70 is a Y-connection 74 one branch of which connects to conduit 75 while the other branch connects to conduit 76. Both of these conduits 75 and 76 pass into the upper section of converter 66 and terminate therein. The branch of 74, which connects to 76, is supplied with a control valve 77 and fixed on 76 is a catalyst cooler 78 with cooling fluid inlet 79 and outlet 80. Feed hopper 68 is connected by means of a gravity feed leg 81 to a seal chamber 82. Seal chamber 82 is provided with a conduit 83 with diaphragm valve 84 thereon controlled by differential pressure controller 85 for the admission of inert seal gas. Conduit 86 with valve 87 thereon extends from the lower section of seal chamber 82 and terminates on Y-connection 74 below valve 77. In the upper section of converter 66 a vertical partition 88 extends laterally across the converter from the top of the converter to a point beneath the surface of contact material column 36 so that two vapor spaces 89 and 90 are formed in the upper section of 66. Contact material feed conduits 75 and 76 terminate within sections 89 and 90, respectively. A hydrocarbon reactant charge conduit 91 connects into section 89 while hydrocarbon reactant charge conduit 92 connects into section 90. In the lower section of converter 66 horizontal transverse partition 47, having a plurality of horizontally spaced apart vertical conduits for the passage of contact material depending downwardly from it, extends across the converter. Vapor disengaging devices, similar to those described in connection with Figure 1, are provided above partition 47. A vertical partition 93 extends across the lower section of converter 66 from the bottom of the converter to partition 47 so that the lower section of the converter is split into two sections 94 and 95. Sections 94 and 95 are provided with product withdrawal conduits 96 and 97, respectively, and purge gas inlets 98 and 99, respectively. Sections 94 and 95 are also provided with contact material withdrawal conduits 100 and 101, respectively, with valves 102 and 103 thereon.

There are several possible modes of operation of the apparatus of Figure 2. In one of these, valve 77 remains open while valve 87 is closed. Contact material then flows solely from hopper 67 and into sections 89 and 90 by means of conduits 75 and 76. The contact material which flows into section 90 may be cooled to a lower temperature than that entering section 89 by means of cooler 78. Contact material is withdrawn from the vertically extending region of column 36 beneath vapor space 89 by means of conduit 100 at a rate controlled by valve 102. Contact material is withdrawn from the vertically extending region of column 36 below vapor space 90 by means of conduit 101 at a rate controlled by valve 103. These two rates may be different, if desired. It should be noted that the two vertically extending regions of column 36 are in open communication with each other except at the extreme upper and lower ends of the converter where they are separated by partitions 88 and 93, respectively. Two separate hydrocarbon reactants are admitted to 89 and 90 by means of conduits 91 and 92, respectively. These reactants are passed downwardly through the two regions of column 36 under flow conditions controlled to prevent interflow of reactants between the two regions. Products from the region below 89 are removed from the conversion zone through conduit 96, while products from the region below 90 are removed through conduit 97.

Alternatively, this apparatus may be operated with contact material being fed to the converter from both hoppers 67 and 68. Contact material in hopper 68 may, if desired, have a contaminant content differing from that in hopper 67. The apparatus would then be operated with valve 77 closed and valve 87 open. Contact material from hopper 67 gravitates into space 89 through conduit 75. Contact material from hopper 68 gravitates downwardly through feed leg 81, seal chamber 82 and conduits 86 and 76 into space 90. The operation then continues as described hereinabove.

Used contact material removed from the conversion zone through conduits 100 and 101 may be mixed and transported to a reconditioner where it will be processed for reuse in the conversion zone. If desired, a separate regenerator may be provided for each of the streams withdrawn from the lower section of converter 66 or a regenerator of similar construction to the above-described converter may be used so that the used catalyst withdrawn from both regions of the conversion zone will be subjected to reconditioning conditions most favorable to its own particular contaminant content.

It should be noted that the system described hereinabove makes possible the variation of a number of operating conditions within one of the two vertically extending regions of compact column 36 without effecting the same operating conditions in the other vertically extending region. Contact material temperature, flow rate and contaminant content may all be varied independently between the two regions of the compact column.

Figure 3 illustrates a modification in the lower section of the converter shown in Figure 2 and like parts in both drawings bear the same numerals. In Figure 3, the vertical partition 93, which extends across the lower section of the converter does not extend upwardly to transverse partition 47. Thus, the products of reaction withdrawn from both regions of the contact material column are removed from the contact material into a common space below partition 47. The products will mix in this space and a single product stream is withdrawn through conduit 104.

Figure 4 illustrates the upper portion of a conversion vessel similar in construction to that shown in Figure 1 and like parts in both drawings bear like numerals. However, the apparatus shown in Figure 4 is designed so that the hydrocarbon charge stocks may be introduced to the converter in the liquid phase rather than the vapor phase. Referring to Figure 4, two sets of ring shaped inverted angle roofed troughs 105 and 106 are shown situated beneath the surface of contact material column 36. Conduit 107 with valve 108 extends horizontally through the wall of converter 10 and vertical conduits 109 depend downwardly from conduit 94 and terminate within inverted troughs 105. Fixed to the ends of conduits 109 within inverted troughs 105 are horizontal ring-shaped pipes 110 having orifices 111 on their under sides. Conduits 112 extend horizontally through the walls of converter 10 and are connected within inverted troughs 106 to horizontal ring-shaped pipes 113 having orifices 114 by means of nipples 115. Conduits 112 are connected at their outer ends into a ring header 116 into which is also connected conduit 117 with valve 118.

In operation, contact material particles gravitate through conduits 35 onto contact material column 36. A heated liquid hydrocarbon charge stock passes through conduit 107 and conduits 109 into ring-shaped pipes 110, from which it is sprayed into the contact material column by means of orifices 111. A second heated hydrocarbon charge passes through conduit 117, ring header 116 and conduits 112 and 115 into pipes 113 from which it is sprayed into the contact material column by means of orifices 114. The operation then proceeds as described in connection with Figure 1.

It should be noted that in this invention the contact material flows substantially unidirectionally, i. e., downwardly, within the compact bed and that there is substantially no interflow of catalyst between adjacent regions of the bed. This makes possible the control of contact material rate, temperature and activity substantially independently in the different regions of the bed.

It is, of course, obvious that other cross-sectional shapes than those described hereinabove may be used in the converter of this invention and that while various forms of the invention described herein employ only two hydrocarbon reactants and two vertically extending regions within the compact column, any number of charge stocks could be converted in the same conversion zone using the method of this invention, provided the conversion vessel were of sufficient cross-sectional area. It is also possible in those modifications employing separate product draw-offs to charge only one charge stock to both the vertically extending regions of the contact material column and adjust conditions within the separate regions so that separate products are obtained from the charge stock. However, generally and preferably the charge stocks are different.

This invention offers several advantages over those prior art systems in which several superimposed zones are used to perform several different reactions. First, the overall height of the apparatus of this invention will be considerably less than the overall height of the apparatus wherein the zones are superimposed. This results in a considerable saving in structural costs. Second, in this invention there is no need for seal zones between the various reaction regions as there is in those processes employing superimposed reaction regions. Third, in this invention the contact material temperature and activity, if the material is catalytic in nature, in one reaction zone is not dependent on that in any other reaction zone, thus providing greater flexibility of operation. Fourth, in this invention, if the contact material is catalytic, the same catalyst activity may be maintained in all the reaction regions, if this is desired.

In some applications of this invention, such as those wherein the charge stocks are very similar in refractiveness, only one contact material draw-off need be provided. In these instances, the contact material flow rate will be the same throughout the converter cross-section and the severity of conditions in the various parts of the converter can only be adjusted by means of the contact material temperature, contaminant content, and the hydrocarbon charge temperature. Also, if desired, a seal region can be provided between the reaction regions to insure that no interflow of materials occurs between the various reaction regions. This may be accomplished by passing an inert seal gas, such as steam, downwardly through the compact column between the various reaction regions.

Vaporized hydrocarbon charge, when employed in this invention, should be introduced to the converter at a temperature within the range about 800° F. to 1150° F. When liquid charge is used, introduction should be made at a lower temperature with in the range about 600° F. to 800° F. The contact material to hydrocarbon ratio on a weight basis may be within the range about 2 to 20 parts of contact material per part of hydrocarbon. If a temperature in excess of 1050° F. is employed in the higher temperature conversion, it is preferable to conduct the low temperature conversion in the outer section near the walls of a converter, such as shown in Figure 1, so that the high temperature will not damage the metal walls of the converter. However, where a temperature above 1050° F. is not employed, it is preferable to conduct the low temperature reaction at the center of the converter. Where one reaction is exothermic and the other endothermic, it is preferable where the temperature level permits to conduct the endothermic reaction in the central portion of the converter, since the temperature level of both reactions is more likely to be maintained in this manner.

This invention is understood to cover all changes and modifications of the example of the invention herein chosen for purposes of disclosure, which do not constitute departures from the spirit and scope of the invention.

I claim:

1. A method for the conversion of two separate fluid hydrocarbon reactants in the presence of a substantially compact moving column of particle form contact material, which comprises: maintaining the compact column of contact material within a confined, elongated conversion zone; maintaining at least two vertically extending regions within said column contiguous to and in open communication with each other along a substantially vertical surface extending the length of said regions; introducing at least one stream of contact material into the first of said regions at temperature controlled to maintain the contact material in said region at a temperature suitable to convert the first of said fluid reactants; introducing at least one stream of contact material into the second of said regions at a temperature controlled to maintain the temperature within said second region at a temperature suitable to convert the second of the fluid reactants; removing contact material from the lower end of said first region at a rate controlled to maintain the contact material flow rate within said region at a rate suitable to convert the first of said fluid reactants withdrawing contact material from said second region at a rate controlled to maintain the contact material flow rate at a rate suitable to convert the second of fluid reactants, which flow rate is different from the flow rate in said first region; passing said first reactant through said first region lengthwise to effect the conversion of said first reactant; passing said second reactant lengthwise through said second region to effect the conversion of said second reactant, the reactant flow condition in both of said regions being controlled to prevent excessive interflow of reactants between the two regions; removing the products of the two conversions from the conversion zone substantially separately of each other.

2. A method for the conversion of two separate fluid hydrocarbon reactants in the presence of a substantially compact moving column of particle form contact material, which comprises: maintaining the compact column of contact material within a confined, elongated conversion zone; maintaining at least two vertically extending regions within said column contiguous to and in open communication with each other along a substantially vertical surface extending the length of said regions; introducing at least one stream of contact material into the first of said regions at a temperature controlled to maintain the contact material in said region at a temperature suitable to convert the first of said fluid reactants; introducing at least one stream of contact material into the second of said regions at a temperature controlled to maintain the temperature within said second region at a temperature suitable to convert the second of the fluid reactants; removing contact material from the lower end of said first region at a rate controlled to maintain the contact material flow rate within said region at a rate suitable to convert the first of said fluid reactants; withdrawing contact material from said second region at a rate controlled to maintain the contact material flow rate at a rate suitable to convert the second of fluid reactants, which flow rate is different from the flow rate in said first region; introducing said first fluid reactant to said first region and passing said first reactant through said first region lengthwise to effect the conversion of said first reactant; introducing the second fluid reactant into said second region separately of the first reactant and passing said second reactant lengthwise through said second region to effect the conversion of said second reactant, the reactant flow condition in both of said regions being controlled to prevent excessive interflow of reactants between the two regions; collecting the products of both conversions together and removing said products from the conversion zone separately of the contact material.

3. The process for conducting two separate reactions, both at temperatures below 1050° F., one endothermic and one exothermic, of two separate fluid reactants within a single moving column of granular contact material, which comprises: maintaining a substantially compact column of granular contact material within a confined conversion zone; maintaining a vertically extending central region within said column and maintaining a vertically extending annular region within said column around said central region in open communication with said region along substantially its entire length; supplying contact material to the upper section of said central region at a temperature controlled to maintain the temperature within said central region suitable for said endothermic reaction; supplying contact material to the upper section of said annular region at a temperature controlled to maintain a temperature suitable for said exothermic reaction within said annular region; passing a fluid reactant lengthwise through said central region to undergo the endothermic reaction; passing a fluid reactant through said annular region to undergo said exothermic reaction under flow conditions controlled to prevent excessive interflow of reactants between said regions; removing at least one stream of reactant products from said conversion zone and removing at least one stream of contact material from the lower section of said column.

References Cited in the file of this patent

UNITED STATES PATENTS

| | | |
|---|---|---|
| 2,439,730 | Happel | Apr. 13, 1948 |
| 2,468,508 | Munday | Apr. 26, 1949 |
| 2,486,229 | Utterback | Oct. 25, 1949 |
| 2,492,999 | Lassiat | Jan. 3, 1950 |
| 2,548,286 | Bergstrom | Apr. 10, 1951 |
| 2,692,903 | Hachmuth | Oct. 26, 1954 |